United States Patent [19]

Muller

[11] 4,021,885
[45] * May 10, 1977

[54] METHOD OF AND APPARATUS FOR MAKING LINK SAUSAGES

[75] Inventor: Johann Muller, Biberach, Germany

[73] Assignee: Firma Albert Handtmann, Biberach, Germany

[ * ] Notice: The portion of the term of this patent subsequent to May 20, 1992, has been disclaimed.

[22] Filed: Jan. 13, 1975

[21] Appl. No.: 540,722

[30] Foreign Application Priority Data

Jan. 22, 1974 Germany .......................... 2402817

[52] U.S. Cl. ........................................ 17/33; 17/49
[51] Int. Cl.² ........................................ A22C 11/00
[58] Field of Search .................... 17/33, 34, 38, 49; 53/177; 100/2

[56] References Cited

UNITED STATES PATENTS

| | | | |
|---|---|---|---|
| 1,292,645 | 1/1919 | Reisfeld | 17/33 |
| 3,435,482 | 4/1969 | Ziolko | 17/49 |
| 3,694,853 | 10/1972 | Grieder | 17/33 |
| 3,868,747 | 3/1975 | Townsend et al. | 17/34 |
| 3,883,925 | 5/1975 | Muller | 17/33 |

FOREIGN PATENTS OR APPLICATIONS

| | | | |
|---|---|---|---|
| 1,532,033 | 8/1973 | Germany | 17/33 |
| 1,125,320 | 8/1968 | United Kingdom | 17/33 |
| 976,987 | 12/1964 | United Kingdom | 17/33 |

*Primary Examiner*—Louis G. Mancene
*Assistant Examiner*—James D. Hamilton
*Attorney, Agent, or Firm*—Ernest G. Montague; Karl F. Ross; Herbert Dubno

[57] ABSTRACT

A strand of sausage filling is pushed stepwise through a tube over which is fitted an empty sausage casing such that as the strand emerges stepwise from the downstream end of the tube it fills the casing. The filled casing is gripped between a pair of conveyor belts whose spacing is predetermined and is pulled away from the tube stepwise synchronously with the advance of the strand in the tube. Between advance steps of the strand and of the filled casing the tube is rotated such that the casing is twisted to form individual sausage links. The instantaneous speed at which the conveyor pulls the filled casing from the tube is proportional to the instantaneous speed of the strand in the tube. The spacing between the conveyor belts may also be varied automatically as a function of the overall conveyor operating speed.

7 Claims, 9 Drawing Figures

METHOD OF AND APPARATUS FOR MAKING LINK SAUSAGES

FIELD OF THE INVENTION

The present invention relates to a method of an apparatus for making link sausage. More particularly this invention concerns a system for producing a succession or chain of link sausages all encased in a commmon sausage casing.

BACKGROUND OF THE INVENTION

The manufacture of link sausages is normally undertaken by successively charging individual portions into a casing and then separating them from each other by the twisting-off of the sausage casing. Piston pumps having a controllable stroke or else continuously operating conveying pumps, such as vane pumps, are driven pulsatingly so as successively to discharge uniform portions and serve as sausage filling pumps. The pulsatingly advancing strand of sausage filling is then discharged at the end of a rotatably supported twist-off tube on which the empty sausage casing is received and from which it is pulled between the tube and an annular braking arrangement disposed thereon. The tube and the braking ring are subjected to a short-term rotation between the individual discharge phases of the filling pump, so that the sausage casing is twisted off at the end of the tube from the filling strand which continues to advance and is prevented from rotating. Further conveyance of the sausages and pulling-off the sausage casing from the tube, as well as the degree of filling of the individual sausage links are therefore determined directly by the velocity of advance of the sausage-filling strand, even though the degree of filling of the sausage casing can be regulated by an adjustment of the frictional force on the braking ring.

This method makes it possible exactly to control the weight of individual sausage links. Length and thickness of the individual sausages are, however, largely dependent on the type of the sausage casing used. In the case of natural intestine casing considerable fluctuations exist with respect to diameter and firmness. In some types of intestine casing increased moisture content and different elasticities of the sausage casing materials lead to diameter fluctuations during filling. Minor diameter fluctuation exist even in synthetic casing. If the filled mass expands upon subsequent cooking the sausage casing can easily burst if filled too tightly. Although the stress placed on the sausage casing can be reduced by an adjustment of the braking ring, the degree of filling and consequently the pressure exerted on the sausage cannot be reduced below preset values, any fluctuations thereof always leading to corresponding changes in the lengths and thickness of the manufactured sausages, when other adjustments are maintained constant. This is particularly disadvantageous if the sausages have to be subsequently packed in a particular fashion, for example in measured quantities, which is economically only feasible if the sausages are of uniform dimensions.

Manufacture of sausage links of uniform length is however known. A continuously driven filling pump produces a sausage-meat strand constantly advancing at a uniform velocity through a stuffing tube and arriving at the end thereof between two conveyor bands with the sausage casing being applied at this location. The empty sausage casing is also rotated uniformly as the conveyed strand advances, while the wrapped sausage strand is prevented from turning. On the conveyor bands there are disposed separation tongues at firmly preset longitudinal intervals which grip the sausage casing externally, constricting it and thus forming a reference point for the rotary tieing off operation.

The length of the sausage links can be only changed by replacing the conveyor bands, the length of the sausages being predetermined by the uniform partitions along the length of the band. The sausages are not, however, of uniform weight since only the filling strand is subdivided longitudinally, the cross-section thereof being determined only approximately by the distance between the conveyor bands. This method is further not suitable for natural intestine sausage casing, but only for synthetic intestine sausage casing having a high degree of firmness and uniform dimensions. The sausage casing is also subjected to considerable external mechanical stresses, particularly since the twist-off operation is continued even if the constricted portion is still disposed between the conveyor bands. Hence high-volume operation can only be obtained if the casing is extremely firm.

OBJECTS OF THE INVENTION

It is therefore an object of the present invention to provide an improved method of and apparatus for making link sausage.

Another object is the provision of a sausage-making system capable of producing link sausage of uniform dimensions and weight at a high production rate.

A further object is the provision of a sausage-making apparatus which can readily be set to produce link sausages of different sizes and weights.

SUMMARY OF THE INVENTION

These objects are attained according to the present invention in a method wherein the sausage-filling strand advances step wise, and the operations of twisting off the individual links and pulling them away from the fillling tube are also intermittent and synchronized with the advance of the filling strand. The advance or pull-off rate is variable.

Thus in accordance with this invention the length of the sausage links is determined by the conveying or pull-off velocity of the sausage casing and the time difference between individual turn-off operations. It follows that the length can be changed at will by simply changing the conveyor velocity, other parameters if necessary remaining unchanged. The link sub-division is accomplished exclusively by the turn-off operation at the end of the fitting tube and is therefore naturally terminated before the constricted portion reaches non-rotatable parts of the conveyor arrangement. No subdivision elements on the conveyor arrangement or the like are therefore necessary to hold the constricted portion. The sausage casing is so gently treated that a high-volume operation can be achieved even in the case of natural gut. In addition the length and diameter of the sausage links are largely independent of the pressure with which the sausage material is supplied. The diameter of the sausage links where they are held or any other cross-sectional measurement thereof is determined by the design of the conveyor arrangement and its layout. This latter can always be chosen taking into account diametral fluctuation of the casing material so that it is not exposed to an internal pressure beyond allowable limits, i.e. the casing material may normally be allowed a certain slackness. It is only this degree of slackness which varies inversely with the local inner diameter of the sausage casing. Sudden stresses are also not encountered, such stresses being normally expected when the sausage casing is briefly subjected to pressure during the pulsating discharge and is then suddenly pulled off. Hence even moist sausage casings which are prone to tear can be filled without bursting during the discharge process or during subsequent cooking.

According to the present invention, during discontinuous filling, continued conveyance of the filled sausages and consequently pulling-off of the sausage casing is alternately controlled with respect to the twist-off process. These processes need not, however, be sharply differentiated in time but may overlap somewhat to achieve an optimal filling efficiency while stressing the sausage casing as little as possible. It is first of all possible to use a twist-off arrangement whose lowest rotation velocity reaches the value of zero only approximately or temporarily during the closing or filling process, but which can temporarily reach considerably higher rotation velocities between dosings.

The pull-off velocity of the sausage casing according to this invention is changed automatically if the dosed or portioned sausage-link weight is changed. The degree of slackness and consequently the stressing of the sausage casing obtained either directly or during an experimental adjustment is then retained when the proportionately or quantity of sausage fitting dosed into each potential link is changed.

According to a further feature of my invention the advance speed of the filled sausage links is changed synchronously and proportionately to the pulsatingly changing discharge velocity of the sausage-filling mass. The chain of filled sausage links therefore advances at an instantaneous velocity proportional to the instantaneous velocity at which the sausage mass is discharged from the tube. If the discharge velocity of the filling pump is purely sinusoidal, then the conveyor arrangement is also correspondingly accelerated and decelerated. If the velocity diagram of the pump differs, however, from a sinusoidal pattern, then the conveyor arrangement is controlled according to the different velocity characteristics.

It is another feature of the invention that the radial pressure exerted on the sausage links which is proportional to their discharge velocity is automatically changed, particularly in the direction opposite to the changing advance velocity. Here, if necessary, the self-actuated proportioning of the conveyor velocity to the dosing weight selected is less important than that a change in the diameter of the sausages, and hence the length of the sausage at a given portion weight due to special control means, result from a purposely changed discharge velocity, i.e. that the enclosed volume remain constant. The possibility remains, however, of changing these conditions at will for altering the degree of filling and hence the stress on the sausage casing.

An apparatus according to this invention for the manufacture of sausage links having equal lengths and weights in a common sausage casing comprises a pump for filling of the sausage mass into a stuffing tube which receives the slack sausage casing, a brake- and twist-off arrangement disposed on the free end of the stuffing tube for retaining and twisting off the slack sausage casing and a transport arrangement coupled to the twist-off arrangement for continuous conveyance and holding of the filled sausage links to prevent rotation thereof. The transport arrangement grips the filled sausages with a plurality of support elements movable in the direction of travel and drivable at a controllable speed. Here the support elements have similarly shaped gripping surfaces, and the twist-off arrangement is controllable in dependence of the sausage mass which has been filled in the intervening time interval.

In accordance with the present invention the variable-speed drive of the conveyor can be coupled at least to the control of the pump drive, i.e. the pump and the conveyor arrangement need in principle only be coupled to each other for control purposes. Their relative velocity ratio is, however, variable in order to obtain different sausage-link lengths with the same quantity of sausage filling per link. The drive of the conveyor is synchronized with the instantaneous discharge velocity of the filling pump if it is of the pulsating type. This can again be accomplished by a controlled coupling, but is best achieved if the conveyor is coupled for example mechanically hydraulically or by an electrical synchro to those drive members of the pump whose velocity varies with the discharge velocity. The conveyor is preferably coupled to the pump drive via a controllable stepless gear-train.

The conveyor of this invention is aligned with the filling tube so that a common linear transport or conveyance axis is followed. A limited pivoting within the twist-off region is certainly possible, particularly if an adjustment of the link diameter can be achieved thereby. The movable support elements are adjustable symmetrically vis-a-vis the common conveyance axis to retain the desired linearity. Thus the adjustment of the movable drive members and the drive of the conveyor are variable inversely in such a manner that each sausage normally encloses an equal volume and so that a once selected degree of slackness or tightness of the sausage wrapping is maintained as much as possible.

Two manually actuated adjustment for respectively adjusting the drive velocity of the conveyor and the radial displacement or spacing of the support elements are, according to this invention, coupled to each other by means of an adjustable coupling or clutch. Both manually actuated adjustment means are provided near each other at the conveyor and can be disposed concentrically.

The conveyor uses oscillating parts for an intermittent motion, where first oppositely disposed support elements are actuated during a first advancement operation and others during another advancement operating gripping the sausages alternately. The conveyor has preferably at least two conveyor belts disposed symmetrically vis-a-vis the common conveyance axis, at least one of which is driven and has a periphery formed with smooth abutment surfaces conforming to the configuration of the largest sausages to be manufactured. It is then possible to operate selectively with a continuous or intermittent motion. Both conveyor belts are advantageously attached to a separate carriers which are adjustable toward each other in opposite senses.

This can be accomplished in accordance with the invention by supporting the guide wheels of both conveyor belts eccentrically on respective eccentric disks, both disks of each belt being coupled to each other for rotation in the same sense, and at least one eccentric disk of each conveyor belt being positively rotationally coupled to an eccentric disk of the other belt. The coupling can be achieved by meashed gears or connecting links for rotation in opposite senses. The drive of both conveyor belts is effected by planetary gearing having a sun gear disposed at the rotation axes of the eccentric disks.

Coupling connections for a common positioning member according to the invention are disposed on the rims of neighboring eccentric disks of respective conveyor belts, the eccentric supports of both respective guide wheels being offset by about 90° with respect to the coupling connections. By this means a position set by the positioning member in the direction of the conveyance axis or opposite thereto is transformed by the eccentric disks into approximately equal respective lateral displacements of each conveyor belts, i.e. the resulting preset change of the diameter of the sausage is twice that of the corresponding change set by the positioning member. The positioning member acts on the coupling connections by means of a screw thread and coupling means effective transverse thereto such as spreader levers or simple connections via elongated holes.

BRIEF DESCRIPTION OF THE DRAWING

The above and other objects, features, and advantages of the present invention will become more readily apparent from the following description reference being made to the accompanying drawing in which.

SECIFIC DESCRIPTION

Figure 1:
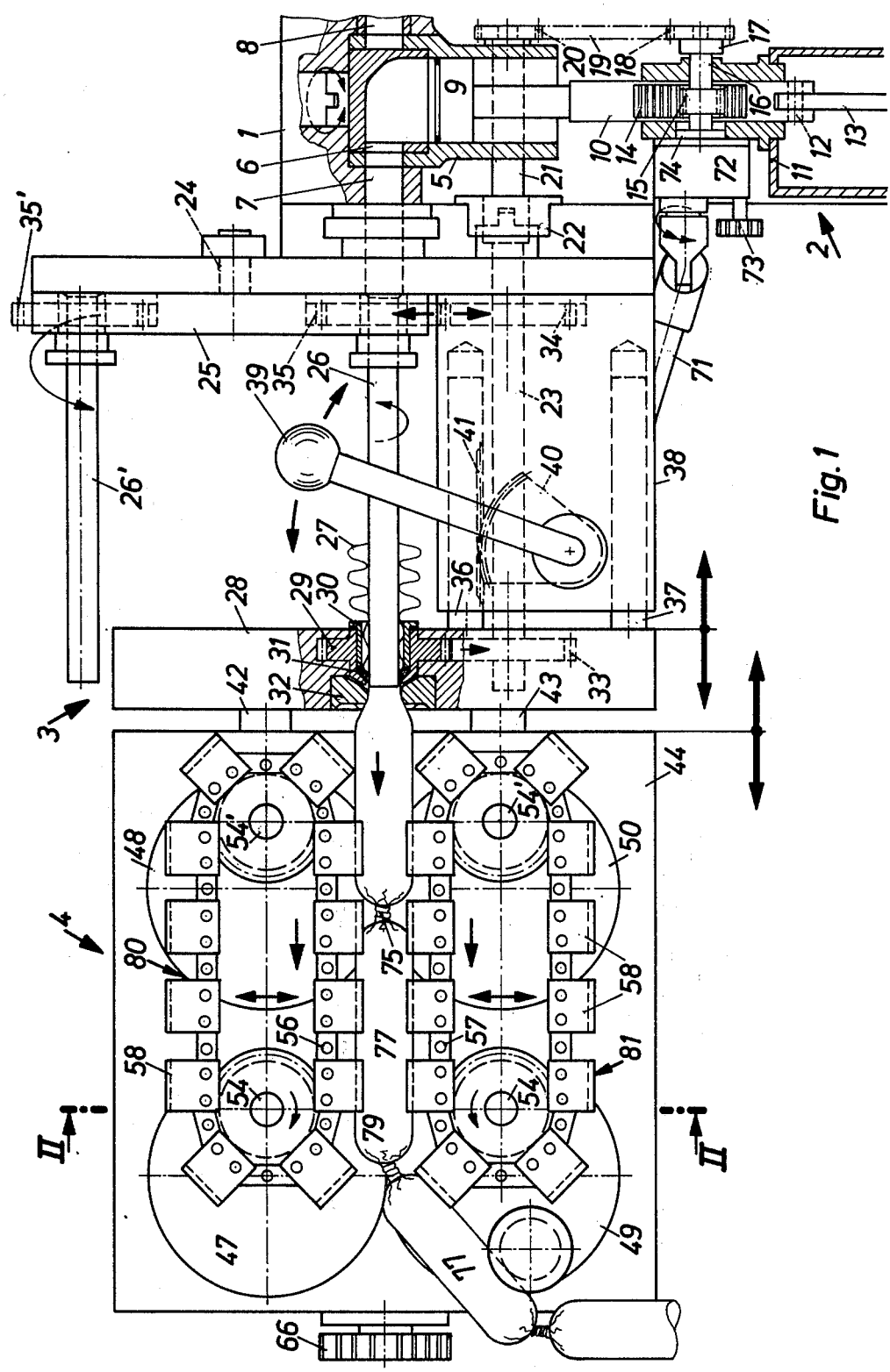
FIG. 1 is a side view partially in section, of an apparatus for the manufacture of sausage links according to the invention.

FIG. 1 shows a sausage-making machine having a housing 1 in which is mounted a dosing or portioning pump 2. A twist-off device 3 and conveyor 4 are also provided on the housing 1.

The portioning pump 2 includes a vertical pump cylinder 5 in whose upper end there is located a rotatable slider 6 whose discharge and filling opening is connected in the rotation position shown with a discharge passage 7 formed in the housing 1 and in another rotation position thereof with an entry passage 8 to which there is supplied under a preset pressure, sausage introduced into a casing or any other mass to be filled. A pump piston 9 disposed in the pump cylinder 5 is connected via a piston rod 10 to a crosshead 11 to whose connecting-rod pivot 12 there is connected a coupler 13 of a crank drive.

The piston rod 10 is formed with a rack 14 which meshes with a pinion 15 carried on a shaft 16 rotatable in the housing 1 and driving a sprocket wheel 18 via a one-way clutch 17 only when piston 9 moves downward, during its intake stroke. This intermittent drive motion is transmitted via a chain 19 and a sprocket wheel 20 to a shaft 21 which is connected via a universal joint 22 with a telescopingly extensible and shortenable twist-off shaft 23. Above the discharge passage 7 a revolvable disk (lurret) 25 which is rotatably supported in a horizontally disposed bearing 24 carries at least two rotatably supported filling tubes 26 and 26'. The upper tube 26' is freely accessible and can be fitted by the machine operator with an empty sausage casing 27 which in the operating position shown is withdrawn from the lower twist-off tube 26.

The lower twist-off tube 26 is aligned with and an extension of the discharge passage 7 and projects into a toothed cylindrical sleeve 29 which is rotatable in a support table 28. A bushing 30 is threaded into the cylindrical sleeve 29 and urges a braking ring 31 against a frustoconical flange thereof so that the braking force exerted on the sausage casing 27 at the end of the twist-off tube 26 can be controlled. A nozzle ring 32 rigidly disposed in the support table 28 is provided in line with and immediately downstream of the downstream end of the tube 26.

The teeth on the outer circumference of the cylindrical sleeve 29 mesh with a gear wheel 33 rotatable in the support table and fixed on the twist-off shaft 23. An additional gear wheel 34 fixed on the twist-off shaft 23 meshes with a gear wheel 35 which is rotatably supported in the revolvable disk 25 coaxial with the discharge passage 7 and mounted on the lower twist-off tube 26 to enable the gear 34 to drive the gear 35. A gear wheel 35' on the twist-off tube 26' can similarly be made to mesh with the gear wheel 34.

The support table 28 is slidable relative to in a plate 38 in a direction parallel to the twist-off tubes 26 and 26' by means of two parallel guide rods 36 and 37, the plate 38 being rigid with the housing 1. The displacement is effected by a lever 39 pivotably supported in the plate 38 and carrying a toothed segment 40 meshing with a rack 41 formed on the rod 36. If the empty sausage casing 27 fitted on the twist-off tube 26 is used up, the twist-off table 28 can be moved by pivoting the hand lever 39 sufficiently to the left as seen in FIG. 1 so that the twist-off tube 26 is withdrawn from the threaded bushing 30. Upon turning of the revolvable disk 25 and a subsequent return movement of the support table 28 the other twist-off tube 26' can be brought into an operative position with a fresh sausage casing 27.

Figure 4:
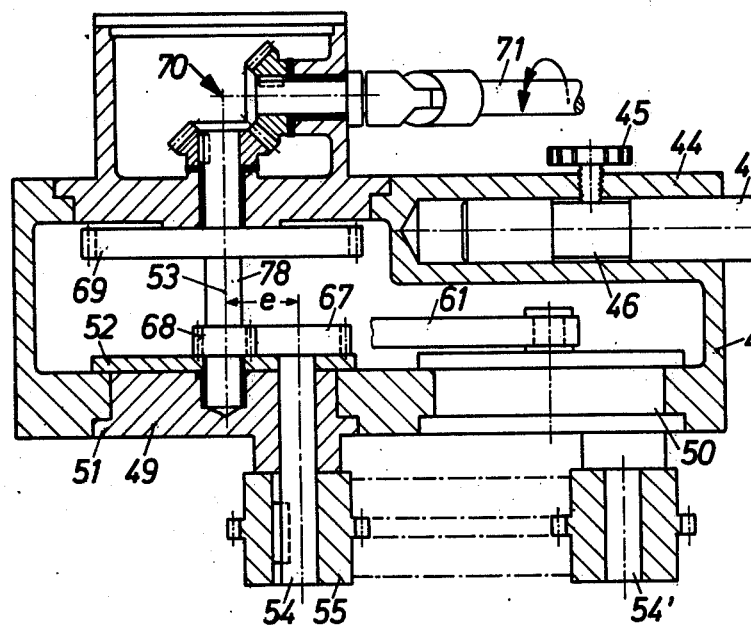
FIG. 4 is a section taken along line IV — IV of FIG. 3.

A conveyor housing 44 is carried on two parallel guide rods 42 and 43 slidable relative to the support table 28 in a direction parallel to the twist-off tube 26. The housing 44 is locked in position by set screws 45 (FIG. 4) which engage in circumferential recesses 46 formed in the rods 42 and 43, thereby limiting the operative adjustmet region. For short sausage links the housing 44 is pushed as closely as possible toward the support table 28 to ensure engagement with the sausage to be produced during the twist-off procedure. For longer sausage links the housing 44 can be pulled out somewhat more.

Figure 2:
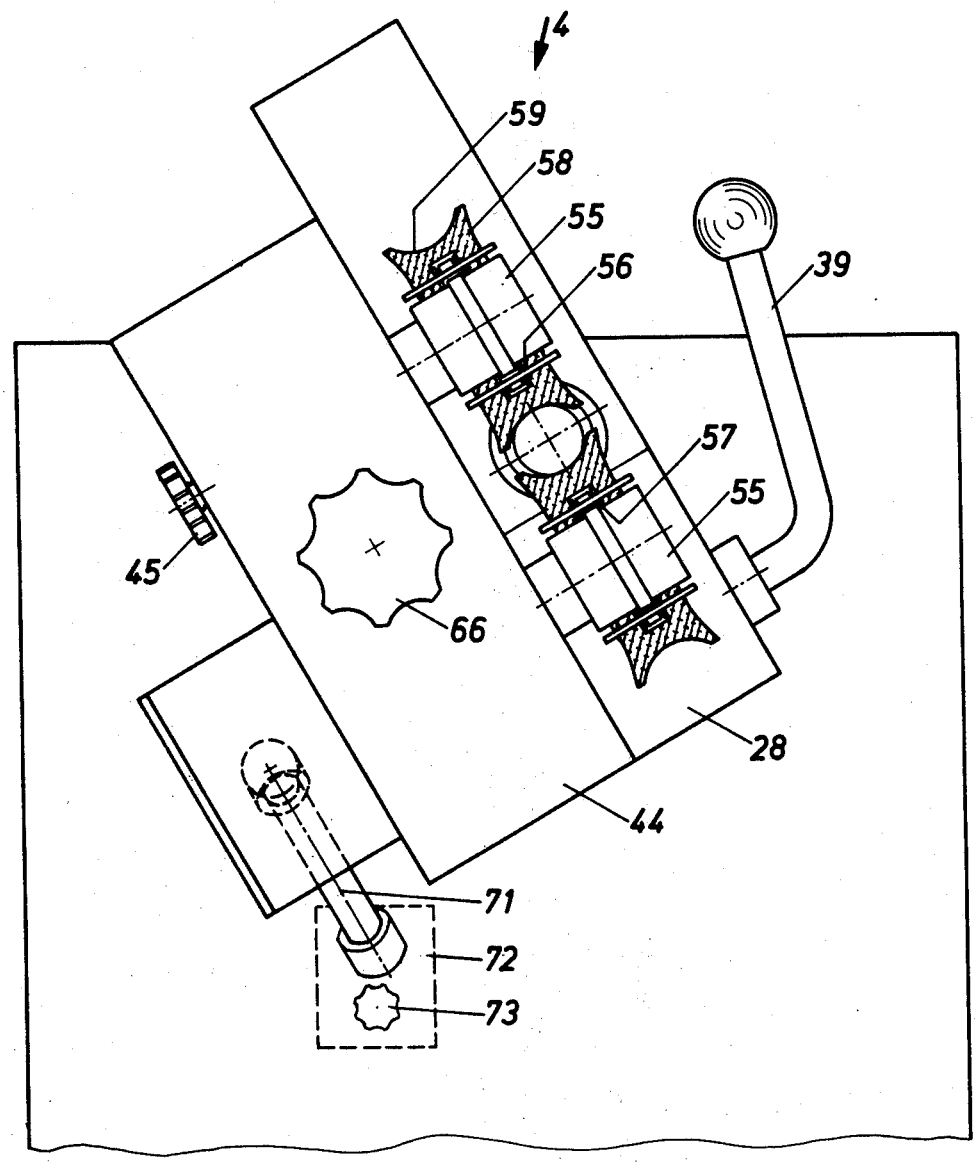
FIG. 2 is a partial section taken along the line II — II of FIG. 1.

Upper eccentric disks 47 and 48 spaced above lower eccentric disks 49 and 50 are rotatably supported on one side of the conveyor housing 44, symmetrical relative to a central axis 79 of the conveyor 4 which axis 79 is an extension of the lower twist-off tube 26. The disks 47–50 are attached axially to the conveyor housing by flanges 51 and rearwardly disposed disks 52. Offset at an eccentricity $e$ with respect to their central support shafts 53, the eccentric disks 47–50 carry respective offcenter crank shafts 54 and 54' on which are mounted sprocket wheels 55 for chains 56 and 57 provided with individual support members 58 to form respective conveyor belts 80 and 81. The support members 58 are blocks of a yieldably resilient material like rubber and each have, as can be best seen from FIG. 2, an external surface 59 which conforms to the larges diameter of sausage to be produced.

Figure 3:
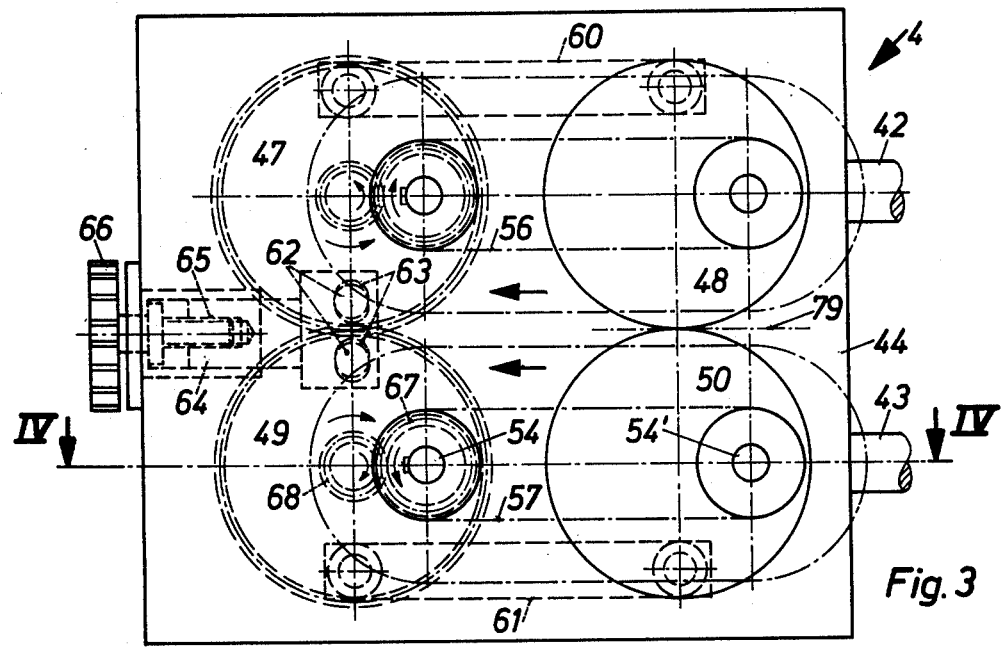
FIG. 3 is a side view of the conveyor with the conveyor belts removed.

The eccentric disks 47 and 48 on one hand, and eccentric disks 49 and 50 on the other hand are coupled to each other by respective connecting rods 60 and 61 to form respective parallel crank-drives. In neighboring rim portions of eccentric disks 47 and 49 there are provided coupling bolts 62 which are engaged in vertical slots 63 formed in a slider 64 which is formed with a threaded bore 65 in which is fitted an adjustment member 66 that is rotatably supported in conveyor housing 44 but not axially displaceable relative thereto. Turning of this adjustment member in one sense displaces the slider 64 to the right in FIG. 3 and displaces the eccentric disks 47 and 49 via respective coupling connections 62 and 63 in respective opposite rotational senses, as shown by the arrows. Such movement is transferred via coupling rods 60 and 61 to the respective eccentric disks 48 and 50. This causes respective eccentrically diposed chain shafts 54 and consequently respective conveyor chains 56 and 57 to be summetrically displaced away from each other with respect to the conveyor axis 79 by about twice the displacement of the slider 64. Upon opposite rotation of displacement member 66 the conveyor chains 56 and 57 approach one another. Since the conveyor belts 80 and 81 form a radial abutment with the concave surfaces 59 on their respective support members 58 for sausages 77, this spacing at least partially determines the maximum sausage links diameter.

Respective planet gear wheels 67 disposed on the shafts 54 of the disks 47 and 49 mesh with respective sun wheels 68 of respective pinion shafts 78 which are coupled together by respective gear wheels 69 (FIG. 4) for rotation of disks 47 and 49 in opposite senses. The lower of the shafts 53 is connected by a pair of bevel gears 70 and a swivel shaft 71 to a steplessly adjustable transmission 72 having a control knob 73 and connected through a one-way clutch 74 to the pinion shaft 16 (FIG. 1). This one-way clutch 74 is effective in the opposite sense to the one-way clutch 17, i.e. it is effective during an upward operating stroke of the pump piston 9. This ensures that the conveyor 4 is only actuated as sausage material is discharged from the twist-off tube 26. Additionally the relative ration of the conveying and discharge velocities of the sausage material as determined by the transmission 72 remains constant at any given time so long as the adjustment is uhchanged. Since piston 9 is sinusoidally displaced by its crank drive, the conveyor is also sinusoidally pulsatingly accelerated and decelerated in an exactly analogous manner.

During the return stroke of piston 9 the twist-off arrangement 3 is actuated between respective discharge operations, so that a twist 75 is formed between respective sausages 77. This twist is easily accomplished since the completed sausages 77 are prevented from turning by being clamped by the conveyor 4 as well as by nozzle ring 32 and since as a result of a pause between respective discharge operaton the advancing sausage strand is temporarily stopped or at least greatly slowed.

The amount of sausage filling discharged by the pump 2 is determined by the length of the piston stroke, which itself can be changed in a known manner, for example by an appropriate formation of the crank drive. The lengths of the sausage links are determined by the driving velocity of the conveyor 4 or by the amount of advance along the conveyor path completed between individual twist-off operations. The length of the sausage link with unchanged dosing can therefore be selected by a change of the transmission ratio of the stepless gearing 72 by means of control knob 73. When the setting remains unchanged individual sausages of an absolutely equal length are therefore obtained, that length being furthermore freely changeable.

The length and diameter of the sausage are consequently independent of the diameter of the sausage casing, which is more or less expandable. It is therefore possible to fill the sausage casing at will in a slack or tight fashion. Not only do the conveyor belts secure the manufactured, or just-produced sausage against rotation, but they also positively pull the sausage casing from the twist-off tube. The conveyor belts must be adjusted radially in an appropriate fashion to ensure sufficient frictional contact against the filled links. This can be separately accomplished manually based on values obtained from experience. It is, however, also possible to connect adjustment member 66 with control knob 73 by a readjustable and detachable coupling. In such a case it may be appropriate to incorporate stepless gear 72 at a different location in the gear train, for example at the bevel gearing 70.

If, on the other hand the amount of sausage filling in each dose is changed by adjustment of the piston stroke, then pinion shaft 16 is pivoted through a correspondingly greater or lesser angle and this movement is transmitted at the preestablished ratio to the conveyor. This results further in a similarly proportional change of the length of the sausage so long as other adjustments remain unchanged. If a different sausage length is desired for this new portion size, then the relative revolution of the conveyor 4 must be changed by means of control knob 73 and, if necessary, the spacing between adjustment members 66 altered.

Figure 5:
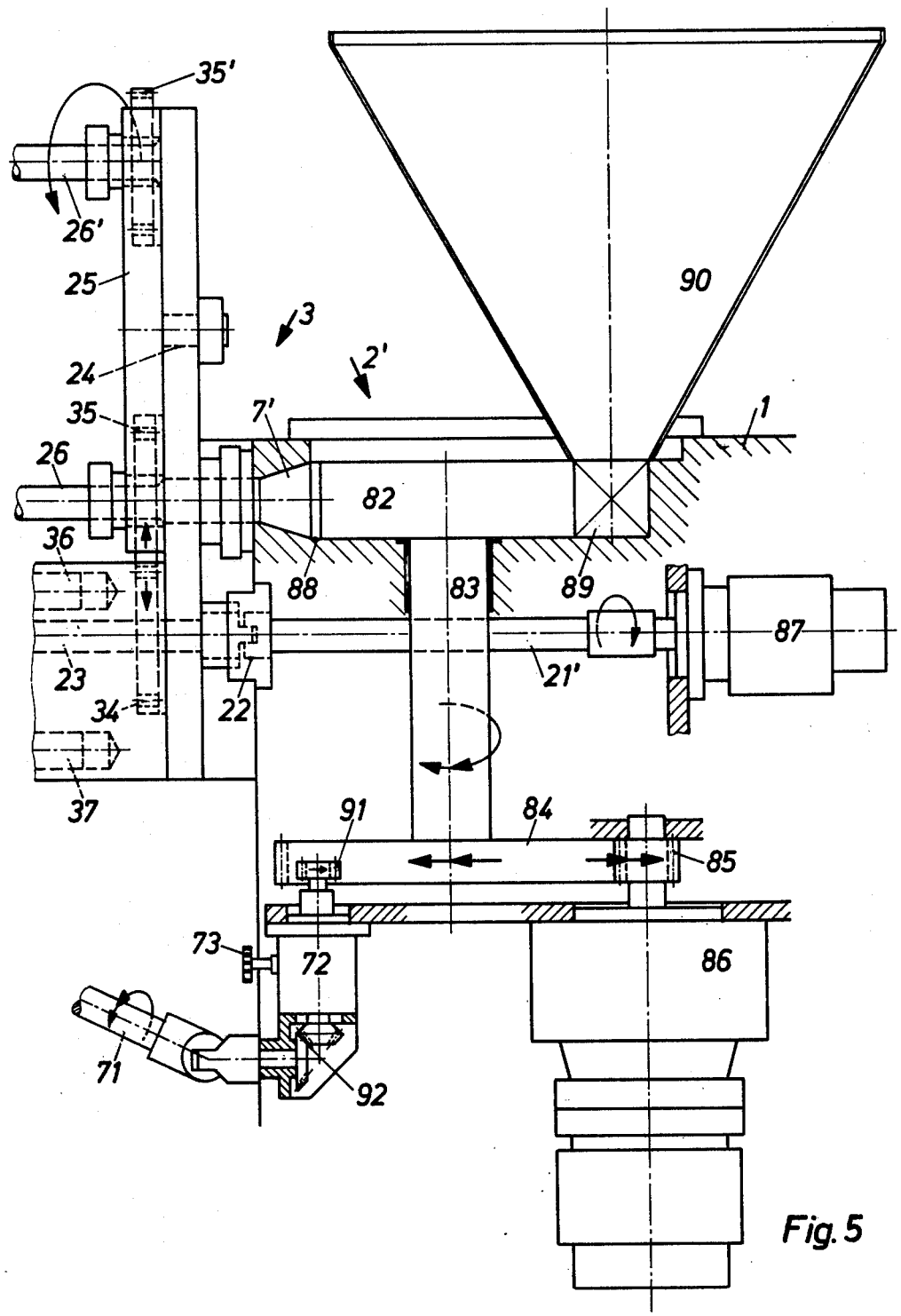
FIG. 5 is a vertical section through another pump drive for the conveyor.

According to FIG. 5 a vane-type pump, cell-type pump or the like is used as a portioning pump 2' whose pump wheel 82 is secured to a shaft 83 carrying a gear wheel 84 driven by a pinion 85 of a hydraulic pump motor 86. A further twist-off motor 87 then drives the twist-off arrangement 3 directly via a shaft 21'. The pump wheel 82 is located eccentrically within a pump chamber 88 in the housing and forms therewith at least one sickle-shaped annular space which extends from a receiving side 89 below a filling funnel 90 to a discharge passage 7', and is subdivided into ring-segment cells by radially displaceable vanes disposed within the pump wheel. Upon rotation of the pump wheel through a certain angle sausage material of a correspondingly equal volume and weight is fed to the discharge conduit.

Upon continuous rotation of the pump wheel a uniformly advancing sausage strand is discharged. If, however, the pump wheel is turned stepwise through equiangular increments the mass strand in the twist-off tube advances and is subdivided by intermittently switching in a twist-off motor 87 which twists off the sausage casing.

The pump motor 86 and the twist-off motor 87 can be alternately switched in. They can also be coupled as a servoarrangement to control motors via a controller-arrangement, which can in turn be controlled by joint or connected command units. The control motors can, for example, be electrical stepping motors which are respectively supplied with a predetermined pulse train by electronic counters. The hydraulic motors can be controlled by valves, which are set by the control-motor and again returned to their starting positions upon completion of a preset angle of rotation.

By this or similar means it is thus not only possible to preset a certain angle of rotation, but it is also possible to control the rotational velocity required at any instant of the switching process. These movements need not be sharply differentiated from each other in time, but can be mutually overlapping, if necessary in such a fashion that the twist-off motor changes its velocity only between a maximum and a minimum.

The stepless gearing 72 remains driven since its pinion 91 meshes with gear wheel 84, and is coupled by bevel-gear train 92 to a pivotable shaft 71. Hence dosing pump 2' and conveyor 4 run at each instant synchronously, or always at proportional velocities.

Figure 7:
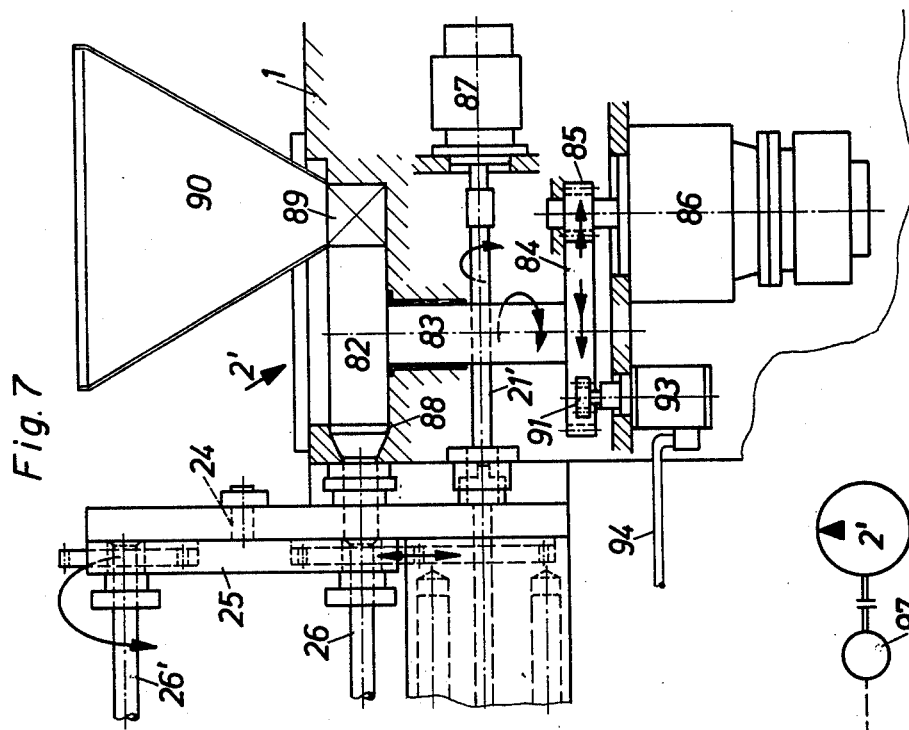
FIG. 7 shows a variation of the drive FIG. 5.
Figure 6:
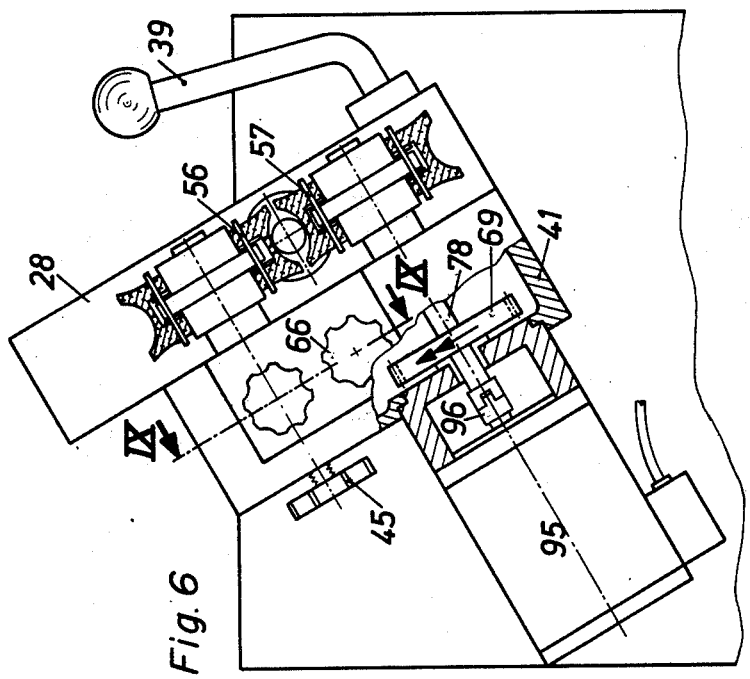
FIG. 6 is a section similar to FIG. 2 but with an electric motor-drive.

In an otherwise unchanged implementation according to FIG. 7 the pinion 91 drives a counter 93. The latter is coupled via a cable 94 with a conveyor motor 95 (FIG. 6) which is coupled via a coupling 96 directly to one of the two pinion shafts 78. Synchronous operation between conter 93 and conveyor motor 95 is effected via cable 94 by any one of known means. The cable may have the form of a synchronous connection, the conveyor motor may be digitally controlled, or any other controller arrangement may be used. The desired synchronous operation between the dosing pump and the conveyor is always obtained by this means.

Figure 8:
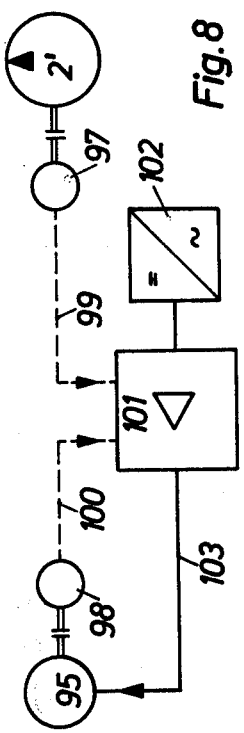
FIG. 8 is a schematic diagram for an electrically coupled conveyor drive working off the pump.

A synchronous control arrangement is shown schematically in the circuit diagram of FIG. 8. The dosing pump 2' and the conveyor pump 95 will be seen to be mechanically coupled to generators 97 and 98 respectively. These are coupled via connections 99 and 100 feeding respective set points and actual values to a common controller 101, which is connected to the electric supply line via a rectifier 102. By a comparison of the set point and actual value a correction signal is formed in the control apparatus, which is supplied via a connection 103 to a conveyor motor 95, the latter therefore being able to be accelerated or decelerated as required.

Figure 9:
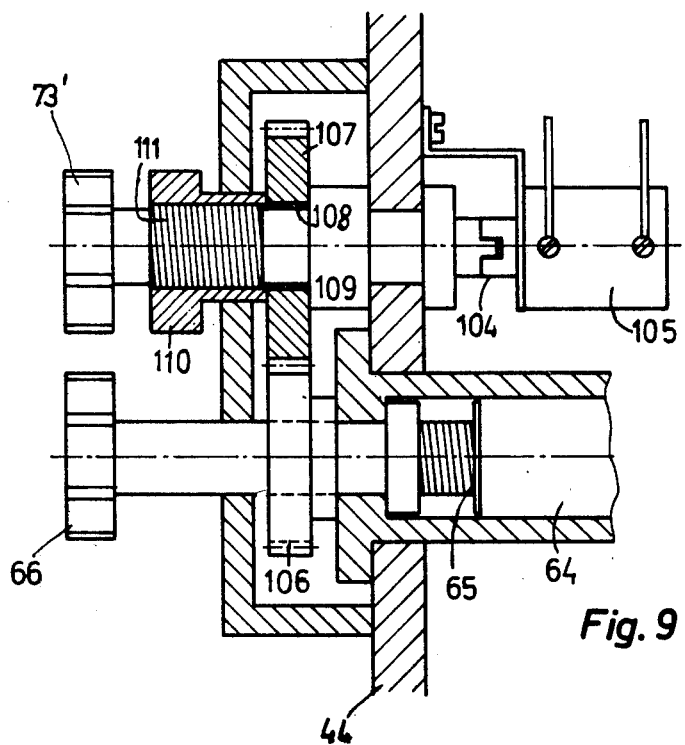
FIG. 9 is a section through a detail of adjustment means according to this invention.

Adjustment member 66 and a control knob 73' are according to FIG. 9 disposed rotatably and parallel to each other on the housing 44 of the supply arrangement. The control knob 73' is coupled via a clutch 104 with a potientometer 105 which controls the number of revolutions of the drive motor of the conveyor or is interposed in the control connection between the dosing pump and the conveyor. While the first of two meshing gear wheels 106 and 107 is firmly secured to adjustment member 66, the gear 107 is rotatably disposed on a shaft 109 of control knob 73 by means of a bushing 108 or the like, but can be locked with respect thereto by means of a flanged bushing 110 which is screwed onto a thread 111 of the shaft. Both adjustment members are normally rotationally coupled to each other so that the actuation of one adjustment control changes the other automatically, an adjustment of the spacing of the conveyor belts giving simultaneous rise to a change in the conveying velocity and vice-versa. If it is desired to change the preset relative adjustment, one unscrews first the flange bushing, gear wheel 107 being thereby decoupled and recoupled thereto again upon a relative adjustment of adjustment member 66 or control 73'.

In lieu of mechanical or electrical couplings it is possible to use hudraulic connections. It can always be ensured by this means that the completed sausages are conveyed in correspondence with the discharge velocity of the sausage mass and that the sausage casing is pulled off correspondingly. Resistance against turning of the sausage casing is ensured by the conveyor belts and can additionally be reinforced by an appropriate formation of the rearward portion of nozzle ring 32, so that the constriction at the end of the twist-off tube can be controlled exactly by the twist-off process even if the dosing pump discharges the mass strand at a constant velocity.

Instead of chains having individual support members it is also possible to use unitary conveyor bands made of rubber or the like.

I claim:
1. In an apparatus for making sausage links of uniform length and weight in a common sausage casing, wherein a filling pump injects a sausage-stuffing mass into a stuffing tube on which the slack sausage casing is carried, a braking and twisting device is provided at a free end of the sausage stuffing tube for holding back and twisting the slack sausage casing relative to the filled links downstream of the tube, and a conveyor downstream from the twisting device for advancing and holding the filled links against rotation, the conveyor engaging the filled links externally with a plurality of suport elements displaceable in the direction of advance of the filled links away from said tube and being drivable with variable speed, the improvement wherein:
   said support elements of said conveyor form support surfaces transverse to the direction of advance; and
   means is provided for controlledly operating said twisting device intermittently in dependence upon the quantity of sausage filling injected into the case from said tube over a previous time interval, said support elements being oppositely symmetrically adjustable relative to an axis of advance of the filled links at said end of said tube.

2. An apparatus for making link sausage, said apparatus comprising:
   an elongated filling tube rotatable about its longitudinal axis and having a downstream end defining a twist-off station, a sausage casing being fitted over said tube and extending beyond said downstream end thereof;
   pump means for advancing a strand of sausage filling through said tube and from the downstream end thereof in a succession of like advance steps, whereby said strand emerges from said downstream end and at least partially fills said casing;
   conveyor means downstream of said downstream end and including at least two longitudinally displaceable spaced-apart support elements for gripping the filled casing while restraining same from rotating and pulling same away from said twisting station generally only during said advance steps;
   means for rotating said tube generally between said advance steps to subdivide said strand and said filled casing into a succession of like links, said conveyor means including a pair of endless belts provided with said elements, two pairs of guide wheels each carrying a respective belt, and two pair of rotatable disks each carrying a respective wheel, said wheels being eccentrically mounted on said; and means for rotating all of said disks so as to move said elements toward and away from each other.

3. The apparatus defined in claim 2 wherein said pump means includes a drive, said apparatus further comprising means between said drive and said conveyor means for displacing said support elements at an instantaneous velocity generally proportional to the instantaneous value of said advance velocity.

4. The apparatus defined in claim 3 wherein said pump means includes a pump having a piston and a rack operatively connected to said piston, said means between said drive and said conveyor means including a pinion meshing with said rack.

5. The apparatus defined in claim 3, further comprising means for varying the spacing between said elements, means for varying the maximum pulling speed of said conveyor means, and means for automatically increasing the pulling speed on a decrease in said spacing and vice versa.

6. A method of making link sausage comprising the steps of:

advancing a strand of sausage filling stepwise to a twisting station;

injecting the strand of sausage filling stepwise at said twisting station into a sausage casing to at least partially fill said casing;

gripping the filled casing while restraining it from rotating and pulling the filled casing downstream from said station stepwise at an instantaneous velocity generally proportional to the instantaneous advance velocity of said strand; and rotating the unfilled sausage casing upstream of said station between advancement steps of said strand being stopped completely at said twisting station between said advancement steps, the advancement velocity of said strand varying generally sinusoidally with time, the filled casing being gripped between a pair of spaced-apart support elements, said method further comprising the step of decreasing the spacing between said elements automatically on increasing the maximum pulling-off speed.

7. In a method of making sausage links of uniform length and weight in a common sausage casing wherein individual portions are formed by rotating the empty portion of the sausage casing relative to the prepared links which are prevented from rotating and which are radially gripped at the filled portions and which are advanced with an adjustable speed, the improvement which comprises:

subdividing the sausage casing into the individual portions by twisting off the sausage casing with intermittent control of the twisting operation dependent upon the volume of sausage filling fed during the previous interval; and wherein the length of the sausage links is established by varying the advancing speed of the filled portions, supports radially engaging the links and being displaced in accordance with the drawing off speed.

* * * * *